United States Patent [19]
Endo et al.

[11] Patent Number: 4,657,973
[45] Date of Patent: Apr. 14, 1987

[54] POLYCARBONATE RESIN COMPOSITION

[75] Inventors: Hideki Endo; Kazuto Hashimoto; Kenji Tanaka, all of Ichihara; Takeshi Matsumoto, Chiba; Keishiro Igi, Kurashiki; Takayuki Okamura, Okayama; Shunro Taniguchi, Kurashiki; Masao Ishii, Kurashiki; Yoshifumi Murata, Kurashiki; Shinichi Yokota, Kurashiki, all of Japan

[73] Assignees: Idemitsu Petrochemical Co. Ltd., Tokyo; Kuraray Company Limited, Kurashiki, both of Japan

[21] Appl. No.: 817,064

[22] Filed: Jan. 8, 1986

[30] Foreign Application Priority Data

Jan. 23, 1985 [JP] Japan .................................. 60-9252
Aug. 7, 1985 [JP] Japan ................................ 60-172412
Oct. 8, 1985 [JP] Japan ................................ 60-222720
Oct. 9, 1985 [JP] Japan ................................ 60-223633

[51] Int. Cl.$^4$ ............................................. C08L 69/00
[52] U.S. Cl. ....................................... 525/67; 525/69; 525/146; 525/148; 525/439; 525/444
[58] Field of Search ................. 525/67, 146, 148, 439, 525/466, 69, 444, 468

[56] References Cited

U.S. PATENT DOCUMENTS 3,957,905  5/1976  Sumoto et al. ...................... 525/439
4,212,791  7/1980  Avery et al. ......................... 525/146

FOREIGN PATENT DOCUMENTS 0097049  8/1978  Japan .

Primary Examiner—Theodore E. Pertilla
Attorney, Agent, or Firm—Frishauf, Holtz, Goodman & Woodward

[57] ABSTRACT

Polycarbonate resin compositions are disclosed, comprising: (1) (A) a polycarbonate resin and (B) polyesterether elastomer, said elastomer composing of a bifunctional carboxylic acid component and a glycol component comprising polyalkylene glycol and ethylene glycol, or (2) the components (A) and (B), and (C) a rubber-like elastomer, or (3) the components (A) and (B), and (D) a polyester resin, or (4) the components (A), (B), (C) and (D). These compositions are excellent in solvent resistance and so forth, and further possess excellent physical and thermal properties characteristic of a polycarbonate resin. Thus the compositions are useful for use in production of industrial and electrical articles, such as a car bumper in the field of car industry.

24 Claims, No Drawings

POLYCARBONATE RESIN COMPOSITION

BACKGROUND OF THE INVENTION

The present invention relates to a polycarbonate resin composition, and more particularly, to a polycarbonate resin composition which is quite excellent in solvent resistance and further which is excellent in stiffness, impact resistance, and properties such as moldability and appearance. This polycarbonate resin composition is useful as a material for use in production of industrial articles such as a car bumper and home electric articles.

A polycarbonate resin is known as a molding resin having excellent physical properties (e.g., stiffness) and thermal properties. A molded article of the polycarbonate resin or polycarbonate resin molding has a disadvantage in that cracks are readily formed in the molding upon application of concentrated stress in a certain kind of solvent. Another disadvantage of the polycarbonate resin as encountered during the molding process is that molding temperature and pressure are high as compared with other resins since its melt viscosity is high.

In order to overcome the above problems of the polycarbonate resin, that is, to improve poor solvent resistance and moldability without reducing its inherent excellent physical properties, it has been proposed to compound various polyesters to the polycarbonate resin.

For example, a composition comprising a polycarbonate resin and polyalkylene terephthalate derived by copolymerization of a bifunctional carboxylic acid component and a diol component having a large amount of an aromatic ring is disclosed in Japanese Patent Publication Nos. 16137/1982, 37633/1979, and Japanese Patent Application Laid-Open No. 102648/1975. This composition, however, has disadvantages in that burning is formed during the molding process because the aromatic ring content of the diol component is increased and in that the diol component is expensive, which is disadvangeous from an economic standpoint. In addition, a composition comprising a polycarbonate resin and polyalkylene terephthalate containing cyclohexanedimethanol as the diol component is disclosed in Japanese Patent Application Laid-Open No. 94536/1978. Addition of this polyalkylene terephthalate, however, seriously decreases stiffness and fails to improve solvent resistance sufficiently. Moreover the composition has a disadvantage in that it is colored and thus can be used only in limited applications.

SUMMARY OF THE INVENTION

The present invention is intended to overcome the above problems of the conventional polycarbonate resin, and an object of the present invention is to provide a polycarbonate resin composition which is excellent in properties such as solvent resistance, moldability and appearance, and still holds its excellent physical properties.

As a result of extensive investigations, it has been found that the object can be attained by compounding a polyesterether elastomer prepared by using a glycol component containing polyalkylene glycol and ethylene glycol in a specific ratio to the polycarbonate resin.

The present invention, in one embodiment, relates to a polycarbonate resin composition comprising:

(A) 92 to 10 percent by weight (wt %) of a polycarbonate resin; and (B) 8 to 90 wt % of a polyesterether elastomer, said polyesterether elastomer composing of 40 to 75 wt % of a bifunctional carboxylic acid component and 60 to 25 wt % of a glycol component comprising 1 to 65 wt % of polyalkylene glycol and 99 to 35 wt % of ethylene glycol. This is hereinafter, for sake of convenience, referred to as the "first invention".

In another embodiment (the second invention), the present invention relates to a polycarbonate resin composition comprising:

(A) 30 to 90 wt % of a polycarbonate resin;

(B) 4 to 45 wt % of a polyesterether elastomer, said polyesterether elastomer composing of 40 to 75 wt % of a bifunctional carboxylic acid component and 60 to 25 wt % of a glycol component comprising 1 to 65 wt % of polyalkylene glycol and 99 to 35 wt % of ethylene glycol; and (C) 1 to 25 wt % of a rubber-like elastomer.

In another embodiment (the third invention), the present invention relates to a polycarbonate resin composition comprising:

(A) 30 to 90 wt % of a polycarbonate resin;

(B) 4 to 45 wt % of a polyesterether elastomer, said polyesterether elastomer composing of 40 to 75 wt % of a bifunctional carboxylic acid component and 60 to 25 wt % of a glycol component comprising 1 to 65 wt % of polyalkylene glycol and 99 to 35 wt % of ethylene glycol; and (D) 2 to 40 wt % of a polyester resin.

In still another embodiment (the fourth invention), the present invention relates to a polycarbonate resin composition comprising:

(A) 30 to 90 wt % of a polycarbonate resin;

(B) 8 to 45 wt % of a polyesterether elastomer, said polyesterether elastomer composing of 40 to 75 wt % of a bifunctional carboxylic acid component and 60 to 25 wt % of a glycol component comprising 1 to 65 wt % of polyalkylene glycol and 99 to 35 wt % of ethylene glycol;

(C) 1 to 25 wt % of a rubber-like elastomer; and (D) 2 to 40 wt % of a polyester resin.

DETAILED DESCRIPTION OF THE INVENTION

The polycarbonate resin that is used as the component (A) in the present invention is a polymer represented by the general formula (I):

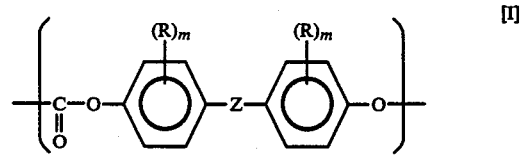

(wherein Z is a bond, or an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, $SO_2$, SO, O, CO or a group

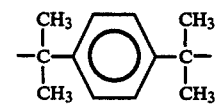

R is a hydrogen atom, a chlorine atom, a bromine atom or a saturated alkyl group having 1 to 8 carbon atoms, and m is a number of 0 to 4).

The polycarbonate resin can be prepared by the solvent process, that is, by the ester exchange reaction of a dihydric phenol and a carbonate precursor such as phosgene, or a dihydric phenol and a carbonate precursor such as diphenylcarbonate in a solvent such as methylene chloride in the presence of an acid acceptor and a molecular weight-controlling agent.

Dihydric phenols which are preferably used are bisphenols. Of these bisphenols, 2,2-bis(4-hydroxyphenyl)-propane (bisphenol A) is particularly preferred. This bisphenol A may be partially or wholly replaced with other dihydric phenol. Dihydric phenols other than bisphenol A include compounds such as hydroquinone, 4,4'-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfone, bis(4-hydroxyphenyl)sulfoxide, and bis(4-hydroxyphenyl)ether, and halogenated bisphenols such as bis(3,5-dibromo-4-hydroxyphenyl)propane and bis(3,5-dichloro-4-hydroxyphenyl)propane. These dihydric phenols may be dihydric phenol homonopolymers, or copolymers of two or more of the dihydric phenols, or mixtures thereof.

The polycarbonate resin which is used in the present invention may be a thermoplastic random branched polycarbonate resin prepared by reacting a polyfunctional aromatic compound with a dihydric phenol and/or carbonate precursor.

The viscosity average molecular weight of the polycarbonate resin is preferably 10,000 to 100,000 and especially preferably 20,000 to 40,000 from viewpoints of mechanical strength and moldability.

In the present invention, as the component (B), a polyesterether elastomer composed of a bifunctional carboxylic acid component and a glycol component comprising polyalkylene glycol and ethylene glycol is used.

In the first invention, the polycarbonate resin composition comprises 92 to 10 wt %, preferably 90 to 30 wt % of the polycarbonate resin as the component (A) and 8 to 90 wt %, preferably 10 to 70 wt % of the polyesterether elastomer as the component (B).

If the amount of the polyesterether elastomer compounded is less than 8 wt %, the solvent resistance of the polycarbonate resin composition is not sufficiently high. On the other hand, if it is in excess of 90 wt %, the polycarbonate resin composition is seriously decreased in stiffness and is unsuitable for practical use.

The polyesterether elastomer that is used in the present invention is a polyesterether elastomer composed mainly of an aromatic dicarboxylate unit represented by the following general formula:

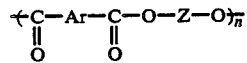

(wherein Ar is an aromatic hydrocarbon group, Z is a dihydric group, and n is a positive number). The inherent viscosity of the polyesterether elastomer is usually 0.4 to 1.5 dl/g and preferably 0.5 to 1.2 dl/g.

The bifunctional carboxylic acid component includes aromatic dicarboxylic acids such as terephthalic acid, isophthalic acid, and naphthalenedicarboxylic acid. Of these compounds, terephthalic acid is preferably used. In combination with terephthalic acid, other bifunctional carboxylic acid may be used within the range that does not deteriorate the effect of the present invention. For example, aliphatic dicarboxylic acids such as oxalic acid, malonic acid, adipic acid, suberic acid, azelaic acid, sebacic acid and decanedicarboxylic acid, and their ester-forming derivatives can be used in combination. In general, the amount of the other dicarboxylic acid component compounded should be controlled to not more than 20 mole % based on the total dicarboxylic acid.

As the glycol component, polyalkylene glycol and ethylene glycol are used in combination. Typical examples of the polyalkylene glycol that can be used are diethylene glycol, triethylene glycol, polyethylene glycol, polypropylene glycol, polytetramethylene glycol, and poly(alkyleneoxide)-α,ω-diol such as poly(tetramethyleneoxide)-α, ω-diol, and random or block copolymers of ethylene oxide and 1,2-propylene oxide. Of these compounds, polyethylene glycol and polytetramethylene glycol, having an average molecular weight of 300 to 8,000, preferably 400 to 3,000 are particularly suitable. To the glycol component which is used in the present invention can be compounded a small amount of alkylene glycol such as polypropylene glycol and the like, if necessary, as long as they do not exert adverse influences on the resin composition.

The glycol component comprises 1 to 65 wt % of polyalkylene glycol and 99 to 35 wt % of ethylene glycol, and preferably 20 to 60 wt % of polyalkylene glycol and 80 to 40 wt % of ethylene glycol. If the proportion of the polyalkylene glycol is less than 1 wt %, solvent resistance is poor. On the other hand, if it is in excess of 65 wt %, the resulting polycarbonate resin composition is decreased in stiffness and furthermore the component (B) itself unsuitably becomes difficult to prepare.

The component (B), polyesterether elastomer, compose of 60 to 25 wt %, preferably 50 to 30 wt % of the glycol component and 40 to 75 wt %, preferably 50 to 70 wt % of the bifunctional carboxylic acid component.

Preparation of the component (B) can be carried out by known techniques. For example, the glycol component and the bifunctional carboxylic acid component are polymerized by heating in the presence or absence of a polycondensation catalyst containing titanium, germanium, antimony and the like, and by-produced water or lower alcohols are withdrawn out of the reaction system.

In the second invention, the polycarbonate resin composition consists essentially of 30 to 90 wt %, preferably 40 to 75 wt % of the component (A), 4 to 45 wt %, preferably 8 to 42 wt % of the component (B), and 1 to 25 wt %, preferably 5 to 20 wt % of the component (C).

If the amount of the component (B) compounded is less than 4 wt %, the solvent resistance of the polycarbonate resin composition is improved only insufficiently. On the other hand, if it is in excess of 45 wt %, the impact resistance of the polycarbonate resin composition is seriously decreased. If the amount of the component (C) compounded is less than 1 wt %, the impact resistance and solvent resistance of the polycarbonate resin composition are decreased. On the other hand, if it is in excess of 25 wt %, the stiffness of the polycarbonate resin composition is decreased and furthermore the appearance is unsuitably poor.

As the rubber-like elastomer which is used as the component (C) in the second invention, various compounds can be used. The following are particularly suitable.

(1) Resinous polymers prepared by polymerizing one or more vinyl monomers in the presence of rubber-like polymers made mainly from alkyl acrylate and/or alkyl methacrylate.

As the alkyl acrylate and alkyl methacrylate, those compounds containing an alkyl group having 2 to 10 carbon atoms are suitable. Typical examples of these compounds are ethyl acrylate, butyl acrylate, 2-ethylhexyl acrylate, and n-octyl methacrylate. The above rubber-like polymers made mainly from these alkyl acrylates mean polymers obtained by reacting 70 wt % or more of the alkyl acrylates and 30 wt % or less of other vinyl monomers copolymerizable with the alkyl acrylates, such as methyl methacrylate, acrylonitrile, vinyl acetate, and styrene. In addition, polymers prepared further adding, as a cross-linking agent, a polyfunctional monomer, such as divinylbenzene, ethylene dimethacrylate, triallyl cyanurate, and triallyl isocyanurate are included.

Vinyl monomers which are polymerized in the presence of the rubber-like polymers include aromatic vinyl compounds such as styrene and α-methylstyrene, acrylic acid esters such as methyl acrylate and ethyl acrylate, and methacrylic acid esters such as methyl methacrylate and ethyl methacrylate. One or more of these vinyl monomers are polymerized. In addition, these vinyl monomers may be polymerized in combination with other vinyl monomers such as vinyl cyanides such as acrylonitrile and methacrylonitrile, and vinyl esters such as vinyl acetate and vinyl propionate.

The polymerization reaction can be carried out by various techniques such as bulk polymerization, suspension polymerization and emulsion polymerization. In particular, resinous polymers prepared by emulsion polymerization are preferred. It is necessary for the resinous polymers to contain at least 20 wt % of the above rubber-like polymers. Typical examples of the resinous polymers are MAS resinous elastomers such as a graft copolymer comprising 60 to 80 wt % of n-butyl acrylate, and styrene and methyl methacrylate, and MS resinous elastomer which is a copolymer of styrene and methyl methacrylate. These MAS resinous elastomers are commercially available, and typical examples are "KM-330" (trade name, produced by Rhome & Haas Co.) and "W529" (trade name, produced by Mitsubishi Rayon Co., Ltd.).

(2) Resinous polymers prepared by the steps of copolymerizing alkyl acrylate and/or alkyl methacrylate and a polyfunctional polymerizable monomer having a conjugated diene-type double bond to prepare copolymers, and of graft polymerizing one or more vinyl monomers to the copolymers.

As the alkyl acrylate and alkyl methacrylate, the compounds as described in (1) above can be used. Typical examples of the polyfunctional polymerizable monomer having a conjugated idene-type double bond are conjugated diene compounds such as butadiene and compounds containing, as well as the conjugated diene-type double bond, a non-conjugated double bond in the molecule thereof. Representative examples are 1-methyl-2-vinyl-4,6-heptadiene-1-ol, 7-methyl-3-methylene-1,6-octadiene, and 1,3,7-octatriene.

In copolymerization of the above alkyl acrylate and/or alkyl methacrylate with the polyfunctional polymerizable monomer having a conjugated diene-type double bond, if necessary, vinyl monomers such as aromatic vinyl compounds (e.g., styrene and α-methylstyrene), vinyl cyanide compounds (e.g., acrylonitrile and methacrylonitrile), vinyl ester compounds (e.g., vinyl acetate and vinyl propionate), vinyl ether compounds (e.g., methyl vinyl ether), and halogenated vinyl compounds (e.g., vinyl chloride; can be added. In addition, cross-linking agents such as ethylene dimethacrylate and divinylbenzene may be added.

In copolymerization of the alkyl acrylate and/or alkyl methacrylate with the polyfunctional polymerizable monomer having a conjugated diene-type double bond, the polyfunctional polymerizable monomer should be used in such an amount that its proportion in the ultimate copolymer is 0.1 to 20 wt % and preferably 1 to 10 wt %.

As the vinyl monomers to be graft polymerized with the above-prepared copolymers, the compounds as described in (1) above can be used. These vinyl monomers are used alone or in combination with each other.

The polymerization reaction can be carried out by various techniques such as bulk polymerization, suspension polymerization and emulsion polymerization. In particular, resinous polymers prepared by emulsion polymerization are preferred.

Suitable examples of the resinous polymer are shown below.

(a) Graft copolymers prepared by the steps of copolymerizing alkyl acrylate or methacrylate (e.g., n-butyl acrylate, 2-ethylhexyl acrylate and methyl methacrylate) with butadiene and further with a small amount of a crosslinking agent (e.g., ethylene dimethacrylate and divinylbenzene) by the usual procedure, and of adding a vinyl monomer (e.g., styrene, acrylonitrile and vinyl chloride) as a graft monomer to the above-prepared latex and graft polymerizing by the usual procedure.

(b) Graft copolymers prepared by the steps of copolymerizing the above alkyl acrylate or methacrylate with a compound containing, as well as a conjugated diene-type double bond, a non-conjugated double bond in the molecule by the usual procedure, and of adding the above vinyl monomer as a graft monomer to the above-prepared latex and graft polymerizing by the usual procedure. This graft copolymerization may be carried out by the one-step method, or by the multi-step method in which the type of the graft monomer is changed at each step.

More specifically, MABS resinous elastomers such as a graft copolymer prepared by the steps of copolymerizing octyl acrylate and butadiene (7:3) to prepare a rubber latex and of adding styrene and methyl methacrylate to the rubber latex and graft copolymerizing, and MBS resinous elastomers such as a graft copolymer prepared by the steps of copolymerizing methyl methacrylate and butadiene to prepare a rubber latex and of adding styrene to the rubber latex and graft polymerizing are suitable.

These MABS resinous elastomers are commercially available, and "HIA 15", "HIA 28" and "HIA 30" (trade names, produced by Kureha Kagaku Kogyo Co., Ltd.) are preferably used.

As the rubber-like elastomer, Component (C), in the second invention, other rubber-like elastomers such as an ABS resinous elastomer which is a copolymer of acrylonitrile, butadiene and styrene; AABS resinous elastomer which is a copolymer of acrylonitrile, acrylic ester, butadiene and styrene; and the like can be used.

In the third invention, the polycarbonate resin composition comprises 30 to 90 wt %, preferably 40 to 75 wt % of the component (A), 4 to 45 wt %, preferably 8 to 42 wt % of the component (B), and 2 to 40 wt %, preferably 3 to 30 wt % of the component (D).

If the amount of the compound (B) compounded is less than 4 wt %, the solvent resistance of the polycarbonate resin composition is improved only insufficiently. On the other hand, if it is in excess of 45 wt %, the impact resistance of the polycarbonate resin composition is seriously decreased and is unsuitable for practical use. If the amount of the component (D) compounded is less than 2 wt %, the polycarbonate resin composition is not satisfactory in stiffness and solvent resistance. On the other hand, if it is in excess of 40 wt %, impact resistance of the polycarbonate resin composition is undesirably decreased.

As the polyester resin, Component (D), in the third invention, various resins can be used. In particular, a polyester resin as obtained by polycondensation of a bifunctional carboxylic acid component and an alkylene glycol component is suitable. As the bifunctional carboxylic acid component, the compounds as described in the component (B) can be used. There are not special limitations to the alkylene glycol component. For example, aliphatic diols having 2 to 15 carbon atoms, such as ethylene glycol, propylene-1,2-glycol, propylene-1,3-glycol, butylene-1,4-glycol, butylene-2,3-glycol, hexane-1,6-diol, octane-1,8-diol, neopentyl glycol and decane-1,10-diol can be used. Of these polyester resins, polyethylene terephthalate and polybutylene terephthalate are particularly suitable.

The polyester resin as the component (D) can be prepared by known techniques. For example, a bifunctional carboxylic acid component and an alkylene glycol component are polymerized by heating in the presence or absence of a polycondensation catalyst containing titanium, germanium, antimony and the like, and by-produced water or lower alcohols are withdrawn out of the reaction system.

In the fourth invention, the polycarbonate resin composition comprises 30 to 90 wt %, preferably 40 to 75 wt % of the component (A), 8 to 45 wt %, preferably 8 to 42 wt % of the component (B), 1 to 25 wt %, preferably 5 to 20 wt % of the component (C) and 2 to 40 wt %, preferably 3 to 30 wt % of the component (D). That is, the polycarbonate resin composition of the fourth invention is prepared by compounding the component (C) described in the second invention and the component (D) described in the third invention to the components (A) and (B) described in the first invention. In other words, the polycarbonate resin composition of the fourth invention is prepared by compounding the component (D) described in the third invention to the resin composition of the second invention.

To the polycarbonate resin composition which is used in the present invention can be compounded various inorganic fillers, additives, other synthetic resins and elastomers, and the like, if necessary, as long as they do not exert adverse influences on the resin composition.

Inorganic fillers which are added for the purpose of increasing the mechanical strength and durability of the polycarbonate resin composition or of increasing the amount of the resin composition include glass fibers, glass beads, glass flakes, carbon black, calcium sulfate, calcium carbonate, calcium silicate, titanium oxide, alumina, silica, asbestos, talc, clay, mica, and powdered silica.

Additives which are used in the present invention include antioxidants such as phosphorous acid or phosphoric acid ester-based antioxidants, ultraviolet absorbers such as benzotriazole and benzophenone-based ultraviolet absorbers, external lubricants such as aliphatic carboxylic acid ester and paraffin-based lubricants, and flame retardants, releasing agents, antistatic agents, coloring agents and the like, which are commonly used.

Other synthetic resins include polyethylene, polypropylene, polystyrene, as an resin, an ABS resin, polymethyl methacrylate, and the like.

Elatomers include an isobutylene-isoprene rubber, a styrene-butadiene rubber, an ethylene-propylene rubber, and an acryl-based elastomer.

The polycarbonate resin composition of the present invention is prepared by compounding and kneading the above components. This compounding and kneading procedure can be carried out by known techniques using, for example, a ribbon blender, a Henschel mixer, a Banbury mixer, a drum tumbler, a mono-axial screw extruder, a bi-axial screw extruder, a cokneader, and a multi-axial screw extruder. Usually the heating temperature in kneading is suitable to be from 250° to 300° C.

The polycarbonate resin composition of the present invention can be molded into the desired moldings such as car parts (e.g., a car bumper) and electric appliances by known molding techniques such as injection molding, extrusion molding, compression molding, calender molding, and rotary molding.

The polycarbonate resin composition prepared according to the first invention provides molding products which have excellent properties in solvent resistance and moldability, and still holds excellent physical properties of a polycarbonate resin.

The polycarbonate resin composition prepared according to the second invention provides molding products which is greatly increased in solvent resistance and improved in physical properties as compared with the resin composition of the first invention.

The polycarbonate resin composition prepared according to the third invention provides molding products which have excellent properties in rigidity of the molding products at the time of the opening of the mold after molding as compared with the resin composition of the first invention.

Therefore, when the molding products is taken out of the mold by pushing with a pin through a small hole of the mold, the surface of the molding products doesn't have even a pin-hole.

The polycarbonate resin composition prepared according to the fourth invention provides molding products which have excellent properties in solvent resistance and is improved in physical properties.

The present invention is described in greater detail with reference to the following examples although it is not intended to be limited thereto.

EXAMPLES 1 to 6, AND COMPARATIVE EXAMPLES 1 TO 3

A bisphenol A-based polycarbonate resin (A-3000, produced by Idemitsu Petrochemical Co., Ltd.; viscosity average molecular weight: 29,000) and a predetermined amount of a polyesterether elastomer having a composition shown in Table 1 were dried independently at 120° C. for 12 hours, and then chip blended, fed to an extruder, kneaded under conditions of a cylinder temperature 270° to 280° C. and a die temperature 270° C., and pelletized.

These pellets were dried at 120° C. for 12 hours and then injection molded at a mold temperature of 80°–90° C. to produce a test piece. This test piece was measured for physical properties, and the results are shown in Table 1.

COMPARATIVE EXAMPLE 7

The procedure of Example 2 was repeated except that a predetermined amount of a polyesterether elastomer having a composition shown in Table 1 was used. The results are shown in Table 1.

TABLE 1

| | | Component (B) Polyesterether Elastomer | | | | | Test Results | | |
|---|---|---|---|---|---|---|---|---|---|
| | Component (A) Polycarbonate Resin (wt %) | Amount Compounded (wt %) | Glycol Component | | | Bifunctional Carboxylic Acid Component Terephthalic Acid Amount (wt %) | Flexural Modulus*3 (kg/cm²) | Flow Value*4 (ml/sec) | Critical Strain*5 (Solvent Resistance) |
| Run No. | | | Polyalkylene Glycol Type | Amount (wt %) | Ethylene Glycol Amount (wt %) | Amount (wt %) | | | | |
| Example 1 | 80 | 20 | PEG*1 | 14 | 86 | 30 | 70 | 28,000 | 8.0 | 0.42 |
| Example 2 | 60 | 40 | " | " | " | " | " | " | 11.8 | 0.6 |
| Example 3 | 40 | 60 | " | " | " | " | " | 26,000 | 16.0 | 1.0< |
| Example 4 | 20 | 80 | " | " | " | " | " | 25,000 | 16.5 | 1.0< |
| Example 5 | 75 | 25 | " | 24 | 76 | 32 | 68 | 28,000 | 9.0 | 0.45 |
| Example 6 | 75 | 25 | PTMG*2 | 14 | 86 | 30 | 70 | " | 8.0 | 0.44 |
| Comparative Example 1 | 95 | 5 | PEG*1 | " | " | " | " | " | 2.8 | 0.25 |
| Comparative Example 2 | 5 | 95 | " | " | " | " | " | 20,000 | 10.0 | 1.0< |
| Comparative Example 3 | 60 | 40 | " | 95 | 5 | 77 | 23 | No good test piece can be obtained because of poor property in rigidity. | | |
| Comparative Example 4 | " | " | — | — | 100 | 27 | 73 | 22,000 | 9.1 | 0.55 |
| Comparative Example 5 | 40 | 60 | — | — | 100 | " | " | 19,000 | 12.8 | 1.0< |
| Comparative Example 6 | 60 | 40 | — | — | 100*6 | 46 | 54 | 18,000 | 8.7 | 0.38 |
| Comparative Example 7 | " | " | PTMG*2 | 42 | 58*7 | 38 | 62 | 27,000 | 13.2 | 0.5 |

Note:
*1PEG: Polyethylene glycol (average molecular weight: 1,000)
*2PTMG: Polytetramethylene glycol (average molecular weight: 1,000)
*3Flexural modulus: Measured according to JIS K6719.
*4Flow value: Measured according to JIS K6719.
*5Critial strain: Measured according to the ¼ oval method described in Nakatuji et al., Shikizai (Colring Matter), Vol. 39, page 455 (1966). That is, the test piece having a thickness of 1 mm was fixed around the jig having a shape of the ¼ oval and was soaked in a mixed solvent of toluene/isooctane/methanol (42.5/42.5/15 vol %) for ten minutes. Then the test piece was taken out of the mixed solvent and the ending point of the occurence of a crack was measured.
*6Cyclohexane dimethanol
*7Tetramethylene glycol

COMPARATIVE EXAMPLES 4 AND 5

The procedures of Examples 2 and 3, respectively, were repeated wherein polyethylene terephthalate (produced by Kuraray Co., Ltd.; inherent viscosity: 0.68 deciliter per gram (dl/g)) was used in place of the polyesterether elastomer. The results are shown in Table 1.

COMPARATIVE EXAMPLE 6

The procedure of Example 2 was repeated wherein a polyester resin produced from terephthalic acid and cyclohexanedimethanol was used in place of the polyesterether elastomer. The results are shown in Table 1.

EXAMPLES 7 TO 12, AND COMPARATIVE EXAMPLES 8 TO 11

A bisphenol A-based polycarbonate resin (A-3000 produced by Idemitsu Petrochemical Co., Ltd.; viscosity average molecular weight: 29,000) and a predetermined amount of a polyesterether elastomer prepared from terephthalic acid and a glycol component as shown in Table 2 were dried independently, and then kneaded and pelletized.

These pellets were dried at 120° C. for 12 hours and then injection molded at a mold temperature of 80°–90° C. to produce a test piece. This test piece was measured for physical properties, and the results are shown in Table 2.

TABLE 2

| | | Component (B) Polyesterether Elastomer | | | | | Test Results | | |
|---|---|---|---|---|---|---|---|---|---|
| | Component (A) Polycarbonate Resin (wt %) | Amount Compounded (wt %) | Glycol Component | | | Bifunctional Carboxylic Acid Component Terephthalic Acid Amount (wt %) | Flexural Modulus*3 (kg/cm²) | Flow Value*4 (ml/sec) | Critical Strain*5 (Solvent Resistance) |
| Run No. | | | Polyalkylene Glycol Type | Amount (wt %) | Ethylene Glycol Amount (wt %) | Amount (wt %) | | | | |
| Example 7 | 60 | 40 | PEG*1 | 45 | 55 | 39 | 61 | 27,000 | 13.4 | 0.6 |

TABLE 2-continued

| | Component (A) Polycarbonate Resin (wt %) | Component (B) Polyesterether Elastomer | | | | | Test Results | | |
|---|---|---|---|---|---|---|---|---|---|
| | | Amount Compounded (wt %) | Glycol Component | | | Bifunctional Carboxylic Acid Component Terephthalic Acid Amount (wt %) | Flexural Modulus*3 (kg/cm²) | Flow Value*4 (ml/sec) | Critical Strain*5 (Solvent Resistance) |
| Run No. | | | Polyalkylene Glycol | | Ethylene Glycol Amount (wt %) | | | | |
| | | | Type | Amount (wt %) | | | | | |
| Example 8 | " | " | " | 50 | 50 | 41 | 59 | 26,000 | 15.0 | 0.7 |
| Example 9 | " | " | " | 60 | 40 | 46 | 54 | 25,000 | 17.5 | 1.0< |
| Example 10 | 40 | 60 | " | " | " | " | " | 26,000 | 18.6 | 1.0< |
| Example 11 | 75 | 25 | " | 50 | 50 | 41 | 59 | 25,000 | 12.5 | 0.6 |
| Example 12 | 60 | 40 | PTMG*2 | " | " | " | " | 26,000 | 15.3 | 0.6 |
| Comparative Example 8 | 5 | 95 | PEG*1 | " | " | " | " | 18,000 | 11.5 | 1.0< |
| Comparative Example 9 | 95 | 5 | " | " | " | " | " | 26,000 | 4.1 | 0.27 |
| Comparative Example 10 | 40 | 60 | " | 80 | 20 | 60 | 40 | 16,000 | 18.5 | 1.0< |
| Comparative Example 11 | 80 | 20 | PTMG*2 | 42 | 58*6 | 38 | 62 | 28,000 | 12.1 | 0.4 |

Note:
*1, *2, *3, *4, *5; Same as defined in Table 1.
*6Tetramethylene glycol

EXAMPLES 13 TO 26, AND COMPARATIVE EXAMPLES 12 TO 18

Predetermined amounts of a polycarbonate resin (PC resin), a polyesterether elastomer and a rubber-like elastomer as shown in Table 3 were dried independently, and then chip blended, fed to an extruder, kneaded at a temperature of 270°–280° C. and then pelletized.

These pellets were dried and then injection molded at a mold temperature of 80°–90° C. to produce a test specimen. This test specimen was measured for physical properties, and the results are shown in Table 3. The testing methods are as follows.

(1) Solvent Resistance

The test specimen was soaked in a mixed solvent of toluene/isooctane/methanol (42.5/42.5/15 vol %) under condition that surface strain of 0.7% in the test specimen was caused by the use of a JIS No. 1 dumbbell. Then the test specimen was taken out of the mixed solvent and was subjected to a tensile test at 50 millimeters per minutes (mm/min). Solvent resistance was indicated in a ratio (percent (%)) of elongation at break of the above treated test specimen to the original test specimen.

(2) Izod Impact Strength
Measured according to ASTM D256.
(3) Flexural Modulus
Measured according to JIS K6719.

TABLE 3

| | Resin Composition | | | | | Test Results | | | |
|---|---|---|---|---|---|---|---|---|---|
| | Component (A) PC Resin*1 (wt %) | Component (B) Polyesterether Elastomer*2 | | Component (C) Rubber-Like Elastomer*3 | | Solvent Resistance (%) | Izod Impact Strength (kg·cm/cm) | | Flexural Strength (kg/cm²) |
| Run No. | | Type | Amount (wt %) | Type | Amount (wt %) | | 23° C. | −15° C. | |
| Example 13 | 50 | A | 35 | MAS-I | 15 | 130 | 72 | 62 | 21,000 |
| Example 14 | 60 | A | 30 | " | 10 | 100 | 75 | 50 | 22,000 |
| Example 15 | 80 | A | 15 | " | 5 | 70 | 82 | 60 | 26,000 |
| Example 16 | 50 | B | 35 | " | 15 | 135 | 70 | 60 | 19,000 |
| Example 17 | 60 | B | 30 | " | 10 | 110 | 72 | 51 | 21,500 |
| Example 18 | 80 | B | 15 | " | 5 | 70 | 75 | 64 | 23,000 |
| Example 19 | 50 | A | 35 | MABS | 15 | 130 | 72 | 62 | 21,000 |
| Example 20 | 70 | A | 20 | " | 10 | 90 | 80 | 65 | 24,000 |
| Example 21 | 80 | A | 15 | " | 5 | 80 | 84 | 62 | 25,000 |
| Example 22 | 50 | B | 35 | " | 15 | 140 | 70 | 53 | 19,000 |
| Example 23 | 70 | B | 20 | " | 10 | 105 | 74 | 54 | 22,000 |
| Example 24 | 80 | B | 15 | MABS | 5 | 85 | 80 | 60 | 24,000 |
| Example 25 | 50 | A | 35 | MAS-II | 15 | 130 | 72 | 50 | 21,000 |
| Example 26 | 50 | B | 35 | " | 15 | 135 | 70 | 54 | 19,000 |
| Comparative Example 12 | 60 | A | 10 | MAS-I | 30 | 10 | 75 | 60 | 19,000 |
| Comparative Example 13 | 90 | A | 5 | " | 5 | 2.3 | 90 | 65 | 27,000 |
| Comparative Example 14 | 40 | B | 50 | " | 10 | 130 | 8.0 | 3.0 | 16,000 |
| Comparative Example 15 | 40 | A | 50 | MABS | 10 | 80 | 50 | 9.0 | 18,000 |
| Comparative Example 16 | 70 | A | 5 | " | 25 | 3.8 | 80 | 55 | 21,000 |
| Comparative Example 17 | 70 | C | 20 | " | 10 | 10 | 85 | 55 | 26,000 |
| Comparative Example 18 | 55 | D | 30 | MAS-I | 15 | 40 | 105 | 83 | 21,000 |

TABLE 3-continued

| | Resin Composition | | | | Test Results | | | |
|---|---|---|---|---|---|---|---|---|
| | Component (A) | Component (B) Polyesterether Elastomer*2 | | Component (C) Rubber-Like Elastomer*3 | | Solvent Resistance | Izod Impact Strength (kg · cm/cm) | Flexural Strength |
| Run No. | PC Resin*1 (wt %) | Type | Amount (wt %) | Type | Amount (wt %) | (%) | 23° C.   −15° C. | (kg/cm²) |
| Example 18 | | | | | | | | |

Note:
*¹PC Resin Bisphenol A-based polycarbonate resin (A-3000, produced by Idemitsu Petrochemical Co., Ltd.; viscosity average molecular weight: 29,000)
*²Polyesterether Elastomer
A: Copolymer comprising 62.8 wt % of a terephthalic acid component, 22.5 wt % of an ethylene glycol component, and 14.7 wt % of a polyethylene glycol component (average molecular weight: 1,000)
B: Copolymer comprising 58.8 wt % of a terephthalic acid component, 20.6 wt % of an ethylene glycol component, and 20.6 wt % of a polyethylene glycol component (average molecular weight: 1,000)
C: Polyethylene terephthalate (IV value = 0.78)
D: Copolymer comprising 62 wt % of a terephthalic acid component, 16 wt % of polytetramethylene glycol (average molecular weight: about 1,000), and 22 wt % of tetramethylene glycol
*³Rubber-Like Elastomer
MAS-I: MAS resin (KM330 produced by Rhome & Haas Co.)
MABS: MABS resin (HIA15 produced by Kureha Kagaku Kogyo Co., Ltd.)
MAS-II: MAS resin (Methaburene W529 produced by Mitsubishi Rayon Co., Ltd.)

EXAMPLES 27 TO 28, AND COMPARATIVE EXAMPLE 19

Predetermined amounts of a polycarbonate resin (PC resin), a polyesterether elastomer and a polyester resin, as shown in Table 4 were dried independently, and then chip blended, fed to an extruder, kneaded at a temperature of 260°–300° C. and then pelletized.

These pellets were molded to produce a test piece. This test piece was measured for physical properties, and the results are shown in Table 4. The testing methods are the same as described in Examples 13 to 26 and Comparative Examples 12 to 18.

EXAMPLES 29 TO 42, AND COMPARATIVE EXAMPLES 20 TO 25

Predetermined amounts of a polycarbonate resin (PC resin), a polyesterether elastomer, a polyester resin, and a rubber-like elastomer as shown in Table 5 were dried independently, and then chip blended, fed to an extruder, kneaded at a temperature of 260°–300° C. and then pelletized.

These pellets were molded to produce a test specimen. This test specimen was measured for physical properties, and the results are shown in Table 5. The testing methods are the same as described in Examples 13 to 26 and Comparative Examples 12 to 18.

TABLE 4

| | Resin Composition | | | | Test Results | | |
|---|---|---|---|---|---|---|---|
| | Component (A) | Component (B) Polyesterether Elastomer*2 | | Component (D) Polyester Resin*3 | Solvent Resistance | Izod Impact Strength (kg · cm/cm) | Flexural Strength |
| Run No. | PC Resin*1 (wt %) | Type | Amount (wt %) | Amount (wt %) | (%) | 23° C.   −15° C. | (kg/cm²) |
| Example 27 | 85 | A | 10 | 5 | 80 | 70   52 | 27,000 |
| Example 28 | 60 | B | 20 | 20 | 100 | 65   40 | 23,000 |
| Comparative Example 19 | 40 | B | 10 | 50 | 30 | 5   2.5 | 25,000 |

Note:
*¹PC Resin: Same as indicated in Table 3 (*¹).
*²Polyesterether Elastomer: A and B are both the same as defined in Table 3 (*²).
*³Polyester Resin: Polyethylene terephthalate (IV value = 0.78)

TABLE 5

| | Resin Composition | | | | | | Test Results | | |
|---|---|---|---|---|---|---|---|---|---|
| | Component (A) | Component (B) Polyesterether Elastomer*2 | | Component (D) Polyester Resin*3 | Component (C) Rubber-Like Elastomer*4 | | Solvent Resistance | Izod Impact Strength (kg · cm/cm) | Flexural Modulus |
| Run No. | PC Resin*1 (wt %) | Type | Amount (wt %) | (wt %) | Type | Amount (wt %) | (%) | 23° C.   −15° C. | (kg/cm²) |
| Example 29 | 50 | A | 15 | 20 | MAS-I | 15 | 100 | 73   62 | 26,000 |
| Example 30 | 60 | A | 15 | 15 | " | 10 | 130 | 78   53 | 23,000 |
| Example 31 | 80 | A | 10 | 5 | " | 5 | 92 | 83   60 | 24,000 |
| Example 32 | 50 | B | 15 | 20 | " | 15 | 120 | 71   63 | 23,000 |
| Example 33 | 60 | B | 15 | 15 | " | 10 | 125 | 76   51 | 21,000 |
| Example 34 | 80 | B | 10 | 5 | " | 5 | 100 | 85   62 | 22,000 |
| Example 35 | 50 | A | 15 | 20 | MABS | 15 | 110 | 71   61 | 26,000 |
| Example 36 | 70 | A | 10 | 10 | " | 10 | 95 | 82   65 | 25,000 |
| Example 37 | 80 | A | 10 | 5 | " | 5 | 80 | 90   59 | 25,000 |
| Example 38 | 50 | B | 15 | 20 | " | 15 | 125 | 72   53 | 23,000 |
| Example 39 | 70 | B | 10 | 10 | " | 10 | 100 | 80   54 | 22,000 |
| Example 40 | 80 | B | 10 | 5 | MABS | 5 | 90 | 89   60 | 24,000 |
| Example 41 | 50 | A | 20 | 15 | MAS-II | 15 | 130 | 73   52 | 25,000 |

TABLE 5-continued

| | Resin Composition | | | | | | Test Results | | |
|---|---|---|---|---|---|---|---|---|---|
| | Component (A) | Component (B) Polyesterether Elastomer[*2] | | Component (D) Polyester Resin[*3] | Component (C) Rubber-Like Elastomer[*4] | | Solvent Resistance | Izod Impact Strength (kg · cm/cm) | | Flexural Modulus |
| Run No. | PC Resin[*1] (wt %) | Type | Amount (wt %) | (wt %) | Type | Amount (wt %) | (%) | 23° C. | −15° C. | (kg/cm²) |
| Example 42 | 50 | B | 15 | 20 | " | 15 | 135 | 71 | 55 | 27,000 |
| Comparative Example 20 | 60 | A | 5 | 5 | MAS-I | 30 | 10 | 74 | 62 | 20,000 |
| Comparative Example 21 | 95 | A | 1 | 1 | " | 3 | 3.1 | 92 | 66 | 27,000 |
| Comparative Example 22 | 40 | B | 45 | 10 | " | 5 | 130 | 9.6 | 2.8 | 18,000 |
| Comparative Example 23 | 40 | A | 10 | 45 | MABS | 5 | 50 | 7.5 | 2.4 | 26,000 |
| Comparative Example 24 | 70 | B | 1 | 4 | " | 25 | 8.2 | 73 | 55 | 23,000 |
| Comparative Example 25 | 55 | D | 15 | 15 | MAS-I | 15 | 8 | 100 | 80 | 23,000 |

Note:
[*1]PC resin: Same as indicated in Table 3 ([*1]).
[*2]Polyesterether elastomer: A, B and D are the same as defined in Table 3 ([*2]).
[*3]Polyester resin: Polyethylene terephthalate (IV value = 0.78)
[*4]Rubber-like elastomer: MAS-I, MABS and MAS-II are all the same as in Table 3 ([*3]).

What is claimed is:

1. A polycarbonate resin composition comprising:
   (A) 92 to 10 wt % of a polycarbonate resin; and
   (B) 8 to 90 wt % of a polyesterether elastomer, said polyesterether elastomer consisting essentially of 40 to 75 wt % of a bifunctional carboxylic acid component and 60 to 25 wt % of a glycol component, said glycol component comprising 1 to 65 wt % of polyethylene glycol and 99 to 35 wt % of ethylene glycol.

2. The composition as claimed in claim 1, wherein the polycarbonate resin (A) has a viscosity average molecular weight of from 10,000 to 100,000.

3. The composition as claimed in claim 1, wherein the polyesterether elastomer (B) has an inherent viscosity of from 0.4 to 1.5 dl/g.

4. The composition as claimed in claim 1, wherein the bifunctional carboxylic acid component is an aromatic dicarboxylic acid.

5. A polycarbonate resin composition comprising:
   (A) 30 to 90 wt % of a polycarbonate resin;
   (B) 4 to 45 wt % of a polyesterether elastomer, said polyesterether elastomer consisting essentially of 40 to 75 wt % of a bifunctional carboxylic acid component and 60 to 25 wt % of a glycol component, said glycol component comprising 1 to 65 wt % of polyethylene glycol and 99 to 35 wt % of ethylene glycol; and
   (C) 1 to 25 wt % of a rubber-like elastomer.

6. The composition as claimed in claim 5, wherein the polycarbonate resin (A) has a viscosity average molecular weight of from 10,000 to 100,000.

7. The composition as claimed in claim 5, wherein the polyesterether elastomer (B) has an inherent viscosity of from 0.4 to 1.5 dl/g.

8. The composition as claimed in claim 5, wherein the bifunctional carboxylic acid component is an aromatic dicarboxylic acid.

9. The composition as claimed in claim 5, wherein the rubber-like elastomer (C) is at least one elastomer selected from the group consisting of MAS resinous elastomer, MS resinous elastomer, MABS resinous elastomer, MBS resinous elastomer, ABS resinous elastomer and AABS resinous elastomer.

10. A polycarbonate resin composition comprising:
    (A) 30 to 90 wt % of a polycarbonate resin;
    (B) 4 to 45 wt % of a polyesterether elastomer, said polyesterether elastomer consisting essentially of 40 to 75 wt % of a bifunctional carboxylic acid component and 60 to 25 wt % of a glycol component, said glycol component comprising 1 to 65 wt % of polyethylene glycol and 99 to 35 wt % of ethylene glycol; and
    (D) 2 to 40 wt % of a polyester resin.

11. The composition as claimed in claim 10, wherein the polycarbonate resin (A) has a viscosity average molecular weight of from 10,000 to 100,000.

12. The composition as claimed in claim 10, wherein the polyesterether elastomer (B) has an inherent viscosity of from 0.4 to 1.5 dl/g.

13. The composition as claimed in claim 10, wherein the bifunctional carboxylic acid component is an aromatic dicarboxylic acid.

14. The composition as claimed in claim 10, wherein the polyester resin (D) is polyethylene terephthalate.

15. A polycarbonate resin composition comprising:
    (A) 30 to 90 wt % of a polycarbonate resin;
    (B) 8 to 45 wt % of a polyesterether elastomer, said polyesterether elastomer consisting essentially of 40 to 75 wt % of a bifunctional carboxylic acid component and 60 to 25 wt % of a glycol component, said glycol component comprising 1 to 65 wt % of polyethylene glycol and 99 to 35 wt % of ethylene glycol;
    (C) 1 to 25 wt % of a rubber-like elastomer; and
    (D) 2 to 40 wt % of a polyester resin.

16. The composition as claimed in claim 15, wherein the polycarbonate resin (A) has a viscosity average molecular weight of from 10,000 to 100,000.

17. The composition as claimed in claim 15, wherein the polyesterether elastomer (B) has an inherent viscosity of from 0.4 to 1.5 dl/g.

18. The composition as claimed in claim 15, wherein the bifunctional carboxylic acid component is an aromatic dicarboxylic acid.

19. The composition as claimed in claim 15, wherein the rubber-like elastomer (C) is at least one elastomer selected from the group consisting of MAS resinous elastomer, MS resinous elastomer, MABS resinous elastomer, MBS resinous elastomer, ABS resinous elastomer and AAABS resinous elastomer.

20. The composition as claimed in claim 15, wherein the polyester resin (D) is polyethylene terephthalate.

21. The composition as claimed in claim 1 wherein
 (A) 90 to 30 wt % of a polycarbonate resin having a viscosity average molecular weight of from 20,000 to 40,000; and
 (B) 10 to 70 wt % of a polyesterether elastomer having an inherent viscosity of from 0.5 to 1.2 dl/g, said polyesterether elastomer consisting essentially of 50 to 70 wt % of a bifunctional aromatic carboxylic acid component and 50 to 30 wt % of a glycol component, said glycol component comprising 20 to 60 wt % of polyethylene glycol and 80 to 40 wt % of ethylene glycol.

22. The composition as claimed in claim 5, wherein
 (A) 40 to 70 wt % of a polycarbonate resin having a viscosity average molecular weight of from 20,000 to 40,000;
 (B) 8 to 42 wt % of a polyesterether elastomer having an inherent viscosity of from 0.5 to 1.2 dl/g, said polyesterether elastomer consisting essentially of 50 to 70 wt % of a bifunctional aromatic carboxylic acid component and 50 to 30 wt % of a glycol component, said glycol component comprising 20 to 60 wt % of polyethylene glycol and 80 to 40 wt % of ethylene glycol; and
 (C) 5 to 20 wt % of a rubber-like elastomer selected from the group consisting of MAS resinous elastomer, MS resinous elastomer, MABS resinous elastomer, MBS resinous elastomer, ABS resinous elastomer and AAABS resinous elastomer.

23. The composition as claimed in claim 10, wherein
 (A) 40 to 70 wt % of a polycarbonate resin having a viscosity average molecular weight of from 20,000 to 40,000;
 (B) 8 to 42 wt % of a polyesterether elastomer having an inherent viscosity of from 0.5 to 1.2 dl/g, said polyesterether elastomer consisting essentially of 50 to 70 wt % of a bifunctional aromatic carboxylic acid component and 50 to 30 wt % of a glycol component, said glycol component comprising 20 to 60 wt % of polyethylene glycol and 80 to 40 wt % of ethylene glycol; and
 (D) 3 to 30 wt % of a polyethylene terephthalate resin.

24. The composition as claimed in claim 15, wherein
 (A) 40 to 70 wt % of a polycarbonate resin having a viscosity average molecular weight of from 20,000 to 40,000;
 (B) 8 to 42 wt % of a polyesterether elastomer having an inherent viscosity of from 0.5 to 1.2 dl/g, said polyesterether elastomer consisting essentially of 50 to 70 wt % of a bifunctional aromatic carboxylic acid component and 50 to 30 wt % of a glycol component, said glycol component comprising 20 to 60 wt % of polyethylene glycol and 80 to 40 wt % of ethylene glycol;
 (C) 5 to 20 wt % of a rubber-like elastomer selected from the group consisting of MAS resinous elastomer, MS resinous elastomer, MABS resinous elastomer, MBS resinous elastomer, ABS resinous elastomer and AAABS resinous elastomer; and
 (D) 3 to 30 wt % of a polyethylene terephthalate resin.

* * * * *